Dec. 15, 1931. W. W. SCHETTLER 1,836,285
VALVE
Filed Nov. 1, 1927 3 Sheets-Sheet 2

INVENTOR
WESLEY W. SCHETTLER,
BY Toulmin Toulmin,
ATTORNEYS

Dec. 15, 1931.   W. W. SCHETTLER   1,836,285
VALVE
Filed Nov. 1, 1927   3 Sheets-Sheet 3
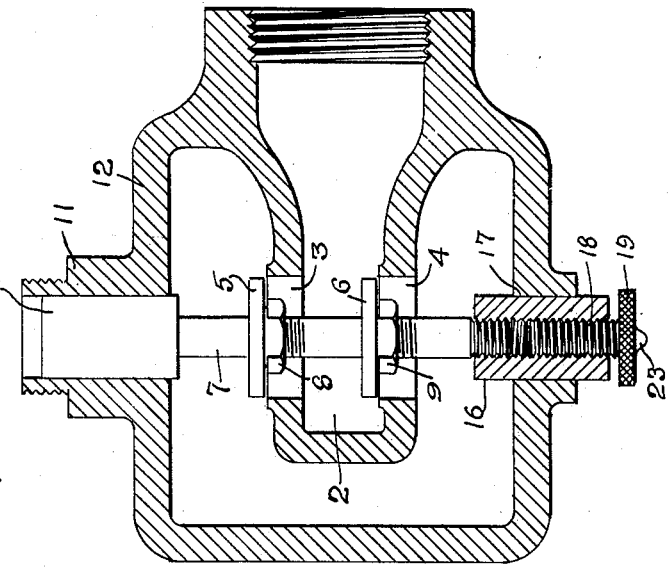
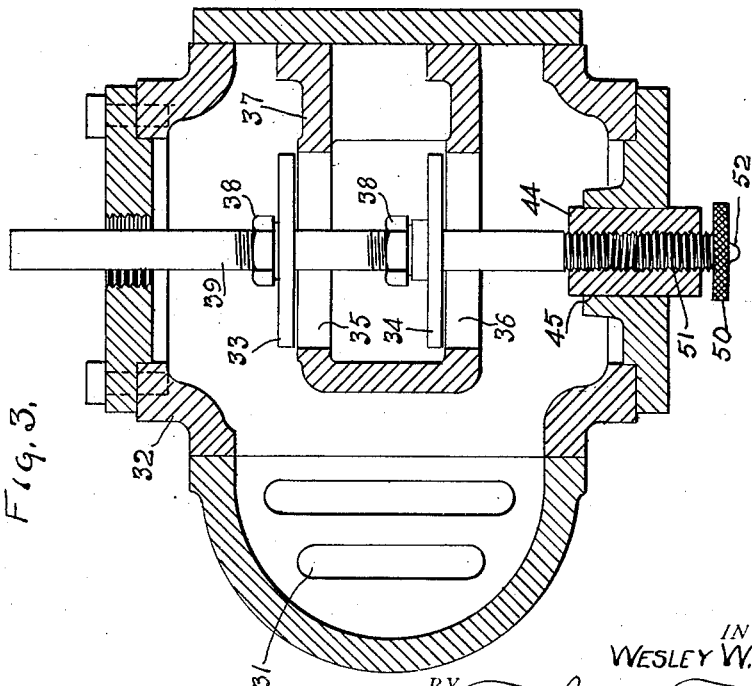
INVENTOR
WESLEY W. SCHETTLER,
BY Toulmin & Toulmin,
ATTORNEYS Patented Dec. 15, 1931

1,836,285

UNITED STATES PATENT OFFICE

WESLEY W. SCHETTLER, OF SPRINGFIELD, OHIO

VALVE

Application filed November 1, 1927. Serial No. 230,352.

My invention relates to valves, and particularly to a valve for carbureting air and hydrogen gas.

It is the object of my invention to provide a valve which enables the use of hydrogen gas as a fuel for internal combustion engines. By hydrogen gas I mean hydrogen without dilution of hydrogen forming a large proportion of the gas used as fuel.

My valve is adaptable to any type of gas, but is especially adaptable to hydrogen because of the impossibility heretofore of being able to use either hydrogen or a gas containing a large proportion of hydrogen without irregularity of operation, premature explosions and back-firing, all of which contribute either to poor operation or bring about a dangerous condition.

It is the object of my invention to provide means of quickly and accurately adjusting, with both a coarse and fine adjustment, the position of the mixing valves, to provide balance valves so that the operation will be uniform irrespective of the variations in atmospheric and fuel pressures, and to provide means for quickly regulating the relative position between the parts of the valve and the governor control therefor, depending upon the varying heats of the engine structure.

Referring to the drawings:

Figure 3 is a section on the line 3—3 of Figure 2.

Figure 4 is a section on the line 4—4 of Figure 2.

Figure 1:
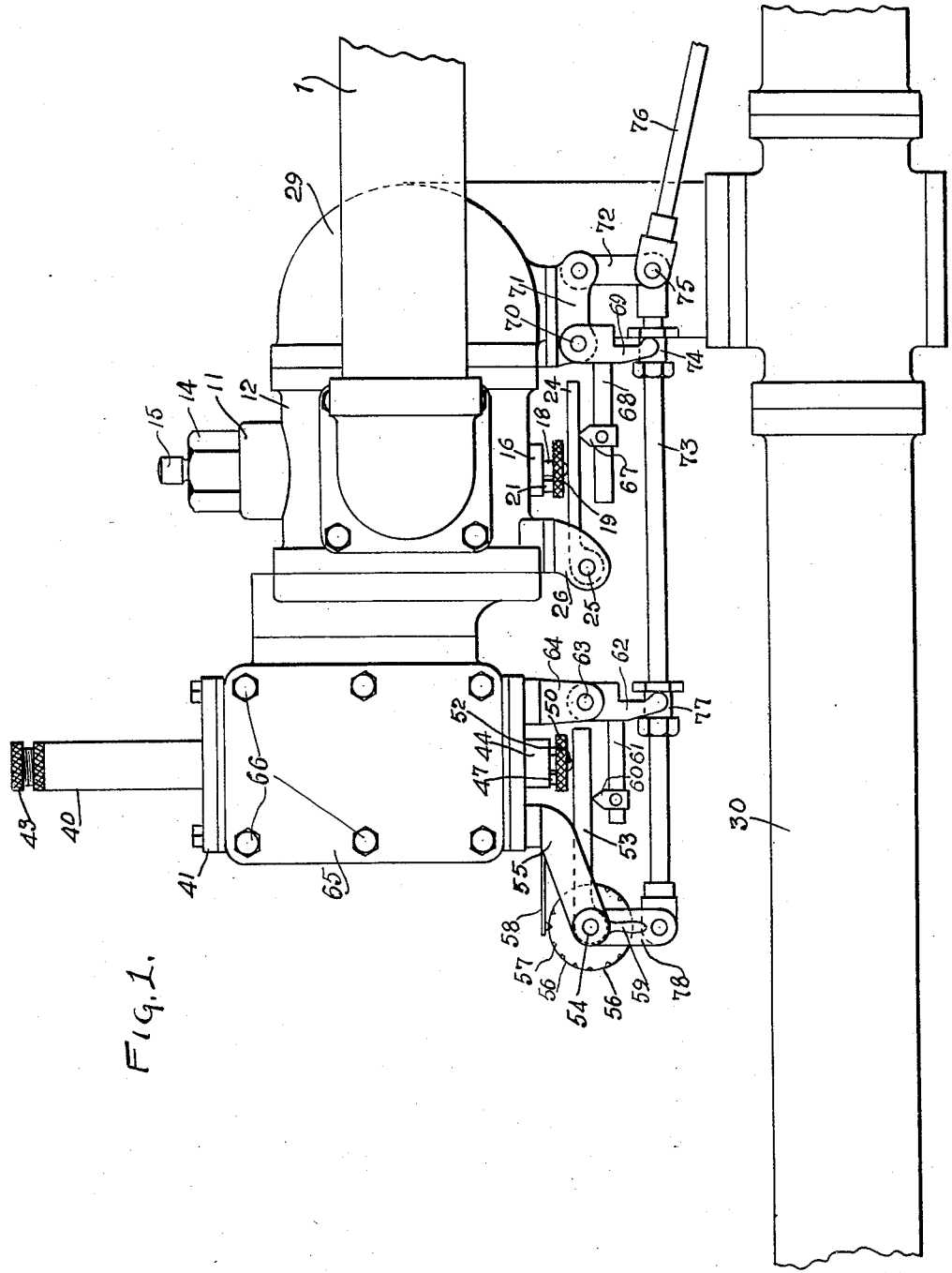
Figure 1 is a front elevation of the valve mechanism as applied to an internal combustion engine.
Figure 2:
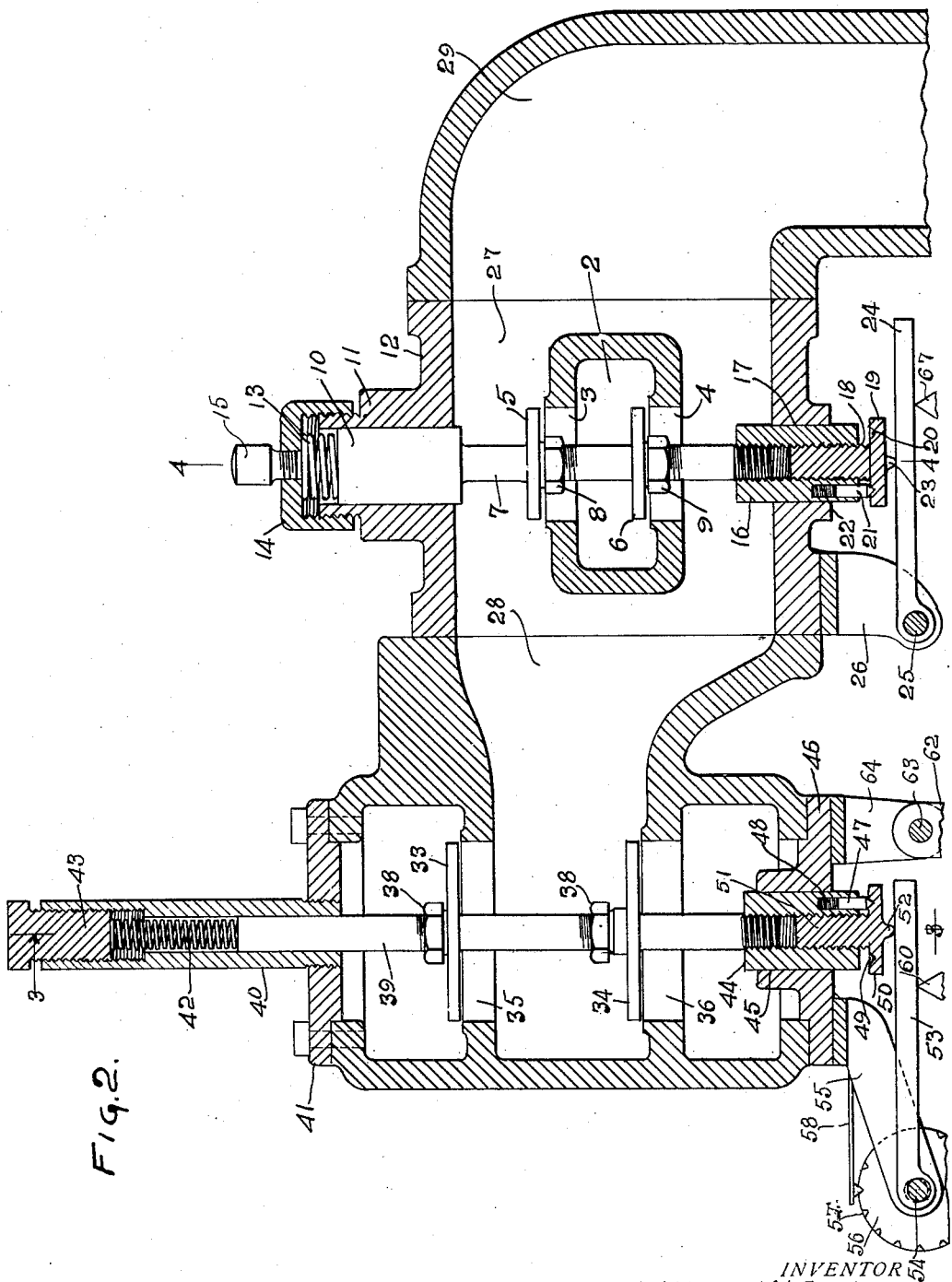
Figure 2 is a vertical section therethrough.

Referring to the drawings in detail, 1 indicates a fuel supply pipe through which the hydrogen or the gas containing a large proportion of hydrogen enters. This pipe communicates with a chamber 2 known as a valve chamber for the gas. The chamber is provided with a pair of aligned, spaced ports 3 and 4, which are closed by the valve discs 5 and 6, respectively. These valve discs are carried on a valve stem 7 and may be adjusted thereon by the nuts 8 and 9. The valve stem is provided with an enlarged plunger 10, which reciprocates at its upper end within a sleeve 11 formed in the mixing valve casing 12. The upper end of this plunger 10 is engaged by a helical spring 13 carried within a cap 14. The cap 14 is detachably mounted on the casing 12.

The lower end of the valve stem is threaded within a sleeve 16, that is guided within an aperture 17 in the lower side of the casing 12. This sleeve 16 is internally threaded and receives a fine adjustment screw 18, which is provided with a head 19 having a plurality of spaced depressions 20 for receiving a spring pressed plunger 21, carried in the sleeve 16, which is pressed outwardly by the spring 22. The lower face of the head 19 is provided with a projection 23, which engages with the actuating lever 24 pivoted at 25 in the bracket 26 on the casing 12.

It will be observed that the pressure of the gas in the chamber 2 will be equal on both valve discs 5 and 6, thereby producing a balance valve so that the variations in pressure effecting both valves equally will not disturb the adjustment of the mechanism, nor its operation.

The incoming fuel passes beneath the valves when they are lifted into the mixing chamber 27 within the casing 12, where it meets air coming from the air chamber 28, as will be hereinafter described. The air and gas mixing within the chamber 27 pass out through the suction of the engine through the pipe 29 to the engine manifold 30.

The air is supplied through a breather 31 on the back of the valve structure adjacent the engine. The air so entering enters into the air casing 32, where the pressure of the air acts equally on the two air valve discs 33 and 34, which control the ports 35 and 36 of the air inlet casing 37, which contains the air inlet chamber 28. The two discs 33 and 34 are adjustably mounted through the nuts 38, upon the air valve stem 39. The upper end of this stem is guided in the sleeve 40 carried on the plate 41 on top of the air valve casing 32. The upper end of this valve stem is engaged by the helical spring 42, which is adjustably compressed by the set screw 43, threaded to the upper end of the sleeve 40.

The lower end of the valve stem is adjustably threaded within a sleeve 44, which reciprocates within an aperture 45 in a closure plate 46 of the air valve casing. This sleeve 44 carries a spring pressed plunger 47 pressed downwardly by the spring 48, which engages with the depressions 49 in a plate head 50 carried on the end of a screw member 51, threaded within the sleeve 44. An engaging head 52 is mounted on the lower end of the plate 50, which engages with the actuating lever 53 which is eccentrically pivoted at 54 within the supporting bracket 55. The shaft 54 carrying this lever 53, has at one end a disc 56 having a series of marginal depressions 57, which are engaged by a spring pressed finger 58 for maintaining the eccentric pivot 54 in any predetermined position.

A handle 59 is provided for actuating the shaft 54 and moving it to the desired position in order to alter the elevation of the lever 53. This eccentric device permits lowering the main air valve discs when the engine is cold to keep the speed at the proper point due to the engine base contracting when cold and expanding when hot. The disc 56 is mounted upon shaft 54, which carries an eccentrically pivoted lever 53. When the eccentric is rotated the lefthand end of the bar 53 is raised or lowered, which in turn lowers or raises the righthand end of the same bar. This is for the purpose that when the engine is cold the crankcase has naturally contracted some, and since the valve is in the center of the engine and the governor on one end, this contraction, through the medium of the throttle rod from the governor to the engine, raises the main or air valve. Therefore, the engine will run too fast when cold, but by turning the eccentric so that the lever 53 is shifted so as to close the throttle valve and after the engine is warmed up, the lever 53 can be returned to its downward or former position, where it will operate normally, due to the heat of the engine. If this were not corrected there would be a change of the adjustment and a change of speed due to the temperature of the engine base. This adjustment permits of a valve movement of approximately .008".

The lever 53 is actuated by a knife edge block 60, which is adjustably mounted upon the actuating arm 61 forming one-half of a bell crank, the other half of which is formed by a depending arm 62. This bell crank is pivoted at 63 upon a depending bracket 64 carried on the bottom of the air valve casing. The air valve casing is accessible through a cover plate 65 retained in position by the bolt 66.

The lever 24 is likewise engaged by a knife edge block 67, adjustably mounted on the arm 68 of a bell crank, the other arm of which is designated 69. This bell crank is pivoted at 70 on a bracket 71. Adjacent to it is a link 72, also pivoted on the bracket 71, the lower end of the link being adapted to pivotally support a reciprocating rod 73 carrying a jaw 74 for engaging with the lower end of the bell crank arm 69 for actuating the bell crank. This reciprocating rod 73 is pivotally connected at 75 to a governor rod 76, which actuates it. This rod may be connected to any type of governor desired.

On the rod 73 is a second jaw 77, engaging the lower end of the bell crank arm 62. The extreme left end of the rod 73 is pivotally supported by the link 78, which is swung from the bracket 55.

Method of operation

Thus the movement of the governor rod 76 will actuate the rod 73 and simultaneously move the bell cranks through the arms 69 and 68, and 62 and 61, thus moving the knife block 67 and 60 and in turn actuating the levers 24 and 53. The actuation of these respective levers actuates the valve discs 5 and 6, and 33 and 34 controlling the fuel and air supplies, respectively. The valves are opened in accordance with the engine conditions, as determined by the governor.

Adjustments

The fine adjustment of the gas valves may be effected through the rotation of the disc 19. The fine adjustment of the air valves may be effected through the rotation of the disc 50.

The adjustment for heat conditions by the movement of the lever 59 and the consequent raising and lowering through the eccentric support for the lever such as 53.

The coarse adjustment is effected by the positioning of the knife block 67 or 60.

Thus it is possible to adjust while the engine is running the entire valve mechanism both for fine adjustment and coarse adjustment, and for heat conditions of the engine. It is possible to simultaneously actuate the valves and possible to have variations in fuel pressure and air pressure without disturbing the setting of the valves, which has already been accomplished. It is further possible to independently adjust the resistance to the movement of the respective valves to still further accomplish the desired refinement or adjustment.

I desire to comprehend within my invention such modifications as may be clearly embraced within my claims and the scope of my invention.

Having thus fully described my invention, what I claim is new and desire to secure by Letters Patent, is:

1. In a combination, a valve casing for mixing air and fuel, a fuel supply means communicating therewith by ports, an air supply means communicating therewith by ports, said several means forming a unitary casing, valves for controlling said ports having valve stems projecting beyond said casing, levers pivoted on said casing for actuating said valve stems, bell cranks pivoted on said casing adjacent each of said levers, knife blocks adjustably mounted on said bell cranks for engaging said levers, and a common actuating rod engaging the other arms of said bell cranks, and means for pivotally, swingingly supporting said actuating rod from said casing, and means to actuate said last-mentioned rod whereby the movement of the knife blocks will effect an adjustment of the degree of actuation of the respective valve stems.

2. In combination, a valve casing for mixing air and fuel, a fuel supply means communicating therewith by ports, an air supply means communicating therewith by ports, said several means forming a unitary casing, valves for controlling said ports having valve stems projecting beyond said casing, levers pivoted on said casing for actuating said valve stems, bell cranks pivoted on said casing adjacent each of said levers, knife blocks adjustably mounted on said bell cranks for engaging said levers, and a common actuating rod engaging the other arms of said bell cranks, and means for pivotally, swingingly supporting said actuating rod from said casing, and means to actuate said last-mentioned rod whereby the movement of the knife blocks will effect an adjustment of the degree of actuation of the respective valve stems, screw members connected to said valve stems adapted to regulate the length of said stems, said screw members engaging with said levers whereby the adjustment of said screw members will effect a fine adjustment of said valves and the actuation thereof.

3. In combination, a valve casing for mixing air and fuel, a fuel supply means communicating therewith by ports, an air supply means communicating therewith by ports, said several means forming a unitary casing, valves for controlling said ports having valve stems projecting beyond said casing, levers pivoted on said casing for actuating said valve stems, bell cranks pivoted on said casing adjacent each of said levers, knife blocks adjustably mounted on said bell cranks for engaging said levers, and a common actuating rod engaging the other arms of said bell cranks, and means for pivotally, swingingly supporting said actuating rod from said casing, and means to actuate said last-mentioned rod whereby the movement of the knife blocks will effect an adjustment of the degree of actuation of the respective valve stems, screw members connected to said valve stems adapted to regulate the length of said stems, said screw members engaging with said levers whereby the adjustment of said screw members will effect a fine adjustment of said valves and the actuation thereof, said screw members having knurled heads and means for maintaining said screw members and heads in predetermined positions when set.

4. In combination, a valve casing for mixing air and fuel, a fuel supply means communicating therewith by ports, an air supply means communicating therewith by ports, said several means forming a unitary casing, valves for controlling said ports having valve stems projecting beyond said casing, levers pivoted on said casing for actuating said valve stems, bell cranks pivoted on said casing adjacent each of said levers, knife blocks adjustably mounted on said bell cranks for engaging said levers, a common actuating rod engaging the other arms of said bell cranks, means for pivotally, swingingly supporting said actuating rod from said casing, means to actuate said last-mentioned rod whereby the movement of the knife blocks will effect an adjustment of the degree of actuation of the respective valve stems, screw members connected to said valve stems adapted to regulate the length of said stems, said screw members engaging with said levers whereby the adjustment of said screw members will effect a fine adjustment of said valves and the actuation thereof, said screw members having knurled heads and means for maintaining said screw members and heads in predetermined positions when set, and yielding means mounted in said casing for resisting the movement of said valve stems and valves.

5. In combination, a valve casing for mixing air and fuel, a fuel supply means communicating therewith by ports, an air supply means communicating therewith by ports, said several means forming a unitary casing, valves for controlling said ports having valve stems projecting beyond said casing, levers pivoted on said casing for actuating said valve stems, bell cranks pivoted on said casing adjacent each of said levers, knife blocks adjustably mounted on said bell cranks for engaging said levers, a common actuating rod engaging the other arms of said bell cranks, means for pivotally, swingingly supporting said actuating rod from said casing, means to actuate said last-mentioned rod whereby the movement of the knife blocks will effect an adjustment of the degree of actuation of the respective valve stems, screw members connected to said valve stems adapted to regulate the length of said stems, said screw members engaging with said levers whereby the adjustment of said screw members will effect a fine adjustment of said valves and the actuation thereof, said screw members having knurled heads, means for maintaining said screw members and heads in predetermined positions when set, yielding means mounted in said casing for resisting the movement of said valve stems and valves, and means for adjusting the compression of said yielding means and the resistance thereof.

6. In combination, a mixing casing having open ends, an inlet manifold connected to one end, an air inlet casing connected to the other end, a gas inlet casing projected through the side thereof having ports opening upwardly and downwardly into the upper and lower halves of the mixing casing so arranged that the incoming air on its way to the inlet manifold will pass over said ports at right angles thereto to completely sweep the ports, an air inlet casing having ports communicating with air inlet passageways, balance valves controlling said respective ports, means for the simultaneous actuation of said valves, and means for the adjustment of the relative positions of said valves.

In testimony whereof, I affix my signature.

WESLEY W. SCHETTLER.